United States Patent [19]

Selberg et al.

[11] Patent Number: 5,571,370
[45] Date of Patent: Nov. 5, 1996

[54] APPARATUS FOR HEAT-SEALING THERMOPLASTIC MATERIALS

[75] Inventors: Hans Selberg, Lund; Gyula Balla, Malmö, both of Sweden

[73] Assignee: Tetra Laval Holdings & Finance S.A., Pully, Switzerland

[21] Appl. No.: 478,856

[22] Filed: Jun. 7, 1995

Related U.S. Application Data

[63] Continuation of Ser. No. 242,962, May 16, 1994, abandoned.

[30] Foreign Application Priority Data

May 19, 1993 [SE] Sweden ................................. 9301733

[51] Int. Cl.$^6$ ................................................ B32B 31/20
[52] U.S. Cl. ..................... 156/498; 156/581; 156/583.2; 493/206; 493/209; 53/374.2; 53/375.9
[58] Field of Search ..................... 156/515, 580, 156/581, 583.1, 583.2, 583.4, 498; 100/93 R, 93 P; 493/206, 209; 53/370.7, 371.2, 373.7, 374.2, 375.9

[56] References Cited

U.S. PATENT DOCUMENTS

| 3,597,237 | 8/1971 | Nughes .................................... 99/171 |
| 3,614,383 | 10/1971 | Watts ................................. 156/515 X |
| 3,640,790 | 2/1972 | Rowley et al. ..................... 156/515 X |
| 3,725,180 | 4/1973 | Membrino ............................... 156/515 |
| 3,927,297 | 12/1975 | Reil ................................. 156/583.1 X |
| 3,948,720 | 4/1976 | Reil ..................................... 156/583 |
| 4,856,259 | 8/1989 | Woo et al. ....................... 156/583.2 X |
| 5,149,943 | 9/1992 | Kupcikevicius et al. ......... 156/583.2 X |

Primary Examiner—James Sells
Attorney, Agent, or Firm—Burns, Doane, Swecker & Mathis

[57] ABSTRACT

An apparatus for heat-sealing thermoplastic materials includes a sealing jaw with a groove in which a thermal strip is mechanically anchored. The flange portions of the jaw projecting on either side of the groove are compressed towards one another and toward the thermal strip to thereby anchor the thermal strip within the groove. The sealing jaw is manufactured from aluminum which has been surface anodized to create an electrically insulating layer between the body of the jaw and the thermal strip.

16 Claims, 2 Drawing Sheets

APPARATUS FOR HEAT-SEALING THERMOPLASTIC MATERIALS

This application is a continuation of application Ser. No. 03/242,962, filed May 16, 1994 now abandoned.

FIELD OF THE INVENTION

The present invention relates to a heat sealing apparatus, and more particularly, an apparat for heat-sealing of thermoplastic materials, that includes a sealing jaw with a jaw body and thermal strip.

BACKGROUND OF THE INVENTION

Packaging containers for, for example, beverages and the like are often manufactured from a web or sheet-shaped packaging material which includes at least one surface of thermoplastic, i.e. heat-sealable or fusible material. The thermoplastic material makes it possible to seal the packaging material to itself or to other parts of the package, and imparts to the packaging material good liquid tightness. In the production of packaging containers from sheet or web-shaped packaging material, the material is often fused or sealed to itself with the aid of sealing jaws which heat and compress the material parts to one another so that the thermoplastic layers fuse together and form a liquid tight seal. Of course, the design and appearance of the sealing jaws is adapted to the particular type of material which is to be sealed, but a feature common to all prior art sealing jaws is that they display some form of thermal emission or thermal generation device. Thus, sealing jaws may, for example at their work surface, display a wire or a strip of electric resistor material which, when it is connected to a current source, is heated to a temperature which makes it possible to heat-seal thermoplastic material. If the packaging material which is to be sealed displays, in addition to a thermoplastic layer, a layer of metal such as aluminium foil, the heating can take place by means of induction heating, in which event a coil disposed in the sealing jaw induces a current in the aluminium foil so that this is heated and in turn conducts heat to the thermoplastic so that this can be sealed. A further possibility achieving for the desired temperature elevation in the thermoplastic layer is by utilizing ultrasonic sound, in which event the wave movement creates frictional heat which makes possible heat-sealing of the thermoplastic.

The above-mentioned methods all suffer from certain drawbacks. Induction heat (IH) for example functions only when the packaging material includes a layer of metallic material or when a layer of metal is otherwise provided within that region which is to be sealed. Ultrasonic heating requires an ultrasonic horn which is relatively large and can be difficult to accommodate at that point in a packaging machine where the sealing is to take place. The use of electric resistor material creates difficulties in design of the jaws, since the resistor material considerably changes shape on being heated and it hereby becomes difficult to connect with the work surface of the sealing jaw and an interjacent electrically insulating layer in such a manner that it is not subject to configurational change during lengthy periods of operation. This applies in particular in the use of electric resistor material for so-called impulse sealing, i.e. when the resistor material is heated during a relatively short period of time (100–600 ms) to a high temperature (120°–450° C.) in order to thereafter rapidly cool. This heating technique makes it necessary to employ a thermal strip of slight surface area, since otherwise the thermal inertia of the strip would be too great. In prior art sealing jaws of this type, it has proved difficult to wholly avoid movements between the jaw and the strip, with the result that the heating zone is changed so that sealing precision is lost. These movements are principally caused by the strip adhering to the surface layer of the packaging material and also showing a tendency to accompany the material when the sealing jaws are parted after sealing is completed. As a result, for example double-sided heating is prevented, i.e. the use of two mutually cooperating sealing jaws on either side of the laid-together packaging material which is to be sealed, since the precision and cooperation between the mutually registering strips is lost as a result of movements between the thermal strips and the sealing jaws. Attempts made hitherto to fix the thermal strip with the aid of welding, mechanical clamping or combinations thereof have resulted in clumsy designs and constructions with loose clamping devices which have hampered the design of the sealing jaw and reduced its versatility of use. In addition, the possibilities of various designs of the thermal strip and its active work surface facing towards the packaging material are considerably restricted.

OBJECTS AND SUMMARY OF THE INVENTION

One object of the present invention is to devise an apparatus for heat-sealing thermoplastic materials, which makes it possible in a simple and reliable manner to realize a permanently stable connection between the jaw body of the sealing jaw and a thermal strip so that the above-outlined difficulties can be obviated.

A further object of the present invention is to devise an apparatus for heat-sealing which is simple and reliable in operation and which may be manufactured at relatively low cost.

Still a further object of the present invention is to devise an apparatus for heat-sealing which is of such stability that it can be employed for double-sided heating without loss of precision in lengthy periods of operation.

Yet a further object of the present invention is to devise an apparatus for heat sealing which affords considerable freedom in the design of the thermal strip.

These and other objects have been attained according to the present invention in that an apparatus for heat-sealing thermoplastic materials includes a sealing, jaw with a jaw body and a thermal strip. The jaw body is of one piece manufacture and displays a groove in which the thermal strip is mechanically anchored, an electrically insulating layer being disposed between the jaw body and the groove.

ADVANTAGES

Since the jaw body according to the invention is manufactured in one piece and displays a groove in which the thermal strip is mechanically anchored, the previously employed complex anchorage methods are now obviated so that the sealing jaw is more universally applicable and can be given freer design. The design and construction are further simplified in that the electrically insulating layer is an integrated part of the jaw body proper.

BRIEF DESCRIPTION OF THE DRAWING FIGURES

Preferred embodiments of the apparatus according to the present invention will now be described in greater detail hereinbelow, with particular reference to the accompanying Drawings which show only those details indispensable for an understanding of the invention. In the accompanying Drawings.

Figure 4A:
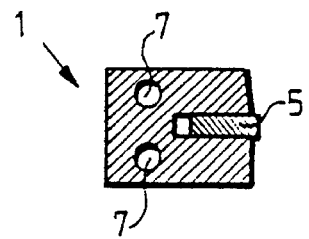
Figure 4B:
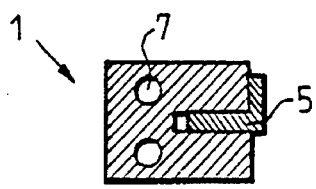
Figure 4C:
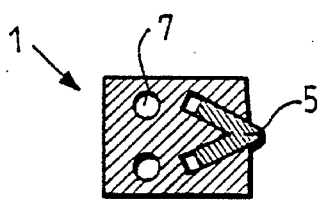
Figure 4D:
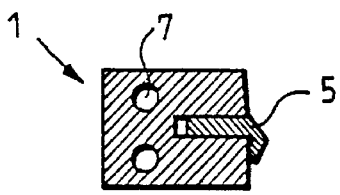
Figure 4E:
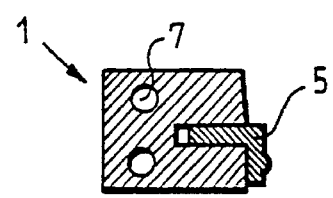
Figure 5:
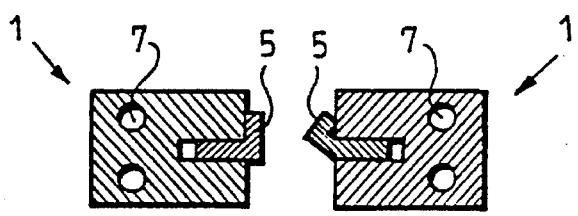

FIGS. 4a–e are cross-sectional views of apparatus according to the present invention with thermal strips of different designs; and FIG. 5 is a cross-sectional view illustrating two cooperating sealing jaws according to the present invention.

DETAILED DESCRIPTION OF PREFERRED EMBODIMENTS

Figure 1:
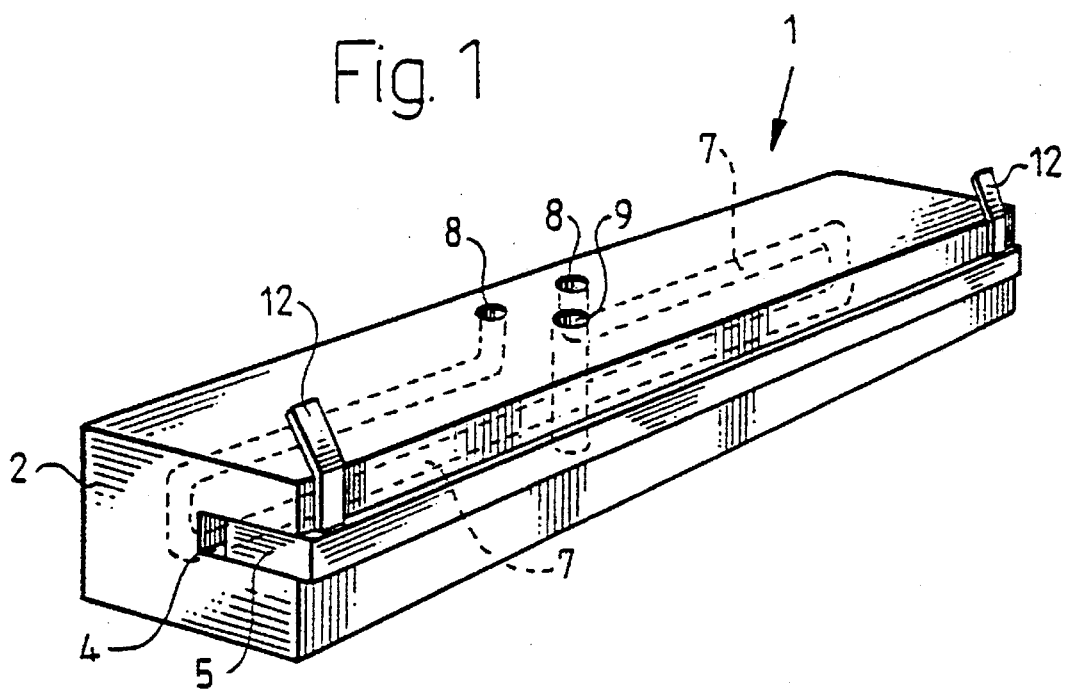
FIG. 1 is a perspective view of the apparatus according to the invention.
Figure 2:
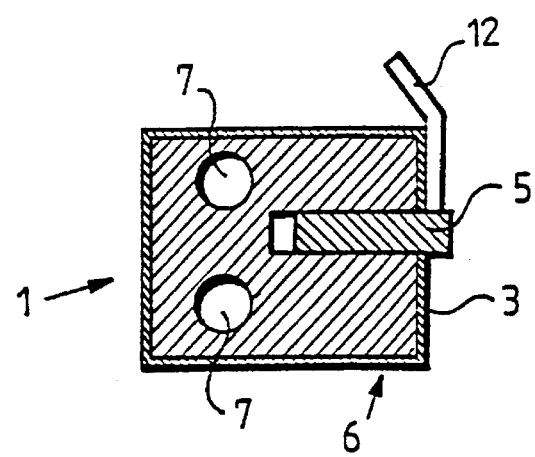
FIG. 2 is a cross-sectional view through the apparatus of FIG. 1.

FIG. 1 shows in perspective a sealing jaw 1 of a type which is suitable for use in a known packaging machine. The sealing jaw 1 according to the invention has a jaw body 2 manufactured from a light metal, for example aluminium, which has been surface anodized (deep anodized) to obtain a surface layer 3 (FIG. 2) with electrically insulating properties. Along its one side, the jaw body 2 has a groove 4 in which a thermal strip 5 is mechanically anchored by the flange portions 6 of the jaw body 2 located on either side of the groove 4 being permanently crimped or clamped together. The thermal strip 5 is fixed a slight distance above the bottom of the groove (0.5–5 mm, preferably approx. 1.5 mm). In the case of a thermal strip 5 having an I-shaped cross section (FIG. 4a), the strip may need support from an edge or other form of projection extending from the bottom, for example a ridge or beam (not shown).

The jaw body 2 further has two internal, substantially parallel cooling ducts 7 which extend on either side of the thermal strip 5 and are in communication with two cooling water connections 8 (FIG. 1) disposed substantially centrally in the jaw body 2. The sealing jaw 1 also displays an anchorage hole 9 by means of which the sealing jaw 1 is interchangeably connectible to a movable jaw holder (not shown) which is integrated in the packaging machine.

Figure 3:
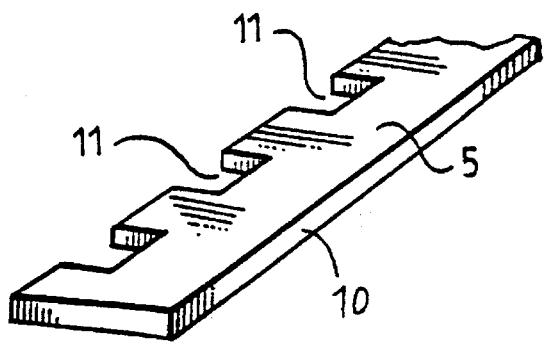
FIG. 3 is a perspective view of a portion of a thermal strip.

The thermal strip 5, which is manufactured from an electric resistor alloy (Nickel alloy with, for example, 43% Ni having a coefficient of thermal expansion of between $1 \times 10^{-6}$ and $17 \times 10^{-6}$, preferably approx. $6 \times 10^{-6}$ (20°–500° C.)), is shown in perspective in FIG. 3. The thermal strip 5 has a front surface or work surface 10 which may be designed in different ways, as will be explained in greater detail below. At the opposing side of the thermal strip in relation to the work surface 10, there is a number of slots 11 which may be of different depths in order to reduce the current area of the thermal strip 5 to a desired degree. The projecting portions of the thermal strip 5 located between the slots 11 will serve as cooling flanges in contact with the jaw body 2. Hereby, excess heat is transferred to the jaw body when this is displaced with the aid of coolant flowing in the cooling ducts 7, for example water. The cooling ducts 7 are connected via the cooling water connections 8 to the cooling system of the packaging machine through which a flow of coolant continuously flows with the aid of a pump (not shown).

The thermal strip 5 further displays, proximal its end regions, transversely projecting electric terminals 12 which are connectible via contactor devices (not shown) to an electric current source.

As has been mentioned previously, the jaw body 2 is provided with an insulating surface layer 3 (indicated in FIG. 2) in the form of a surface anodizing, which prevents contact between both the electric terminals, the thermal strip 5 and the jaw body 2. The insulating surface layer may possibly be restricted in extent to those parts of the jaw body against which the thermal strip 5 or the electric terminals 12 abut. Similarly, it is possible to provide an insulating surface layer on the thermal strip 5, which may supplement or replace the surface layer of the jaw body 2.

A number of different embodiments of the apparatus according to the present invention are shown in FIGS. 4a–e. While the jaw body and other parts belonging to the sealing jaw 1 are of substantially the same design as that shown in FIG. 1, the groove 4 and, above all, the thermal strip 5 show varying configurations. In particular when the strip possesses an I-shaped configuration (FIG. 4a), the groove can, moreover, be given a non-linear configuration, for example with curved or step-shaped portions. Depending upon the type of packaging material which is to be sealed, a thermal strip is selected with a work surface which is designed to give the optimum sealing effect. While retaining unchanged the design of the groove 4 in the jaw body 2, the thermal strip can, for example, be given an I-shaped cross section (FIG. 4a) or an L-shaped cross section (FIG. 4b). Both of these configurations afford good contact between the thermal strip and the jaw body 2, which is an advantage in view of both stability and thermal dissipation. The V-shaped thermal strip 5 (FIG. 4c) also affords a good contact surface against the jaw body 2, and the somewhat more complicated design and construction comprising two grooves 4 is moreover offset by an extremely stable clamping in place and a thoroughly fixed thermal strip which does not undergo any configurational changes even under the severest of working conditions. More over, the thermal strip does not move when it is heated.

The forms of the thermal strip 5 illustrated in FIGS. 4d and 4e display work surfaces with relatively sharp longitudinal edges, which is an advantage when the packaging material is to be powerfully compressed within a restricted region, for example when the sealing region passes a portion with several layers of packaging material. Both of these cross-sectional configurations of the thermal strip 5 utilize a single, straight groove 4 but do have the disadvantage that the contact surface between the thermal strip and the jaw body 2 is slightly reduced, which results in a slight deterioration in thermal dissipation. Further cross-sectional configurations of the thermal strip, combinations of different configurations and other shapes of the groove 4 are also naturally conceivable without departing from the spirit and scope of the inventive concept as herein disclosed.

FIG. 5 schematically illustrates how two sealing jaws according to the invention can be employed for realizing double-sided heating during sealing of packaging material, in particular packaging laminates which include layers which per se are insulating layers (paper, foamed material etc.) and prevent or in any event impede requisite thermal transmission to the mutually facing thermoplastic material layers which are to be sealed to one another. Different combinations of the strip configurations shown in FIGS. 4a–4e may, in such instance, be utilized depending upon the material types which are to be sealed. By, for instance, designing the thermal strip of the one jaw with a planar, preferably wide work surface and the cooperating jaw with a narrower edge or end surface, a good cooperation will be achieved which is not appreciably influenced by inaccuracies which may occur as a result of lengthy periods of operation in the moving parts of the packaging machine which carry the sealing jaw. This design further makes it possible more readily to compress or "crush" possibly thicker material portions (intersecting overlap joints or seams etc.) so that a good seal quality is achieved.

In all illustrated embodiments of the apparatus according to the present invention, the jaw body is of one piece manufacture and displays a groove in which the thermal strip is mechanically fixedly clamped by crimping or clamping together the flange portions of the jaw body located on either side of the groove so that one or both portions are plastically deformed. This produces a sealing jaw in which the thermal strip is securely retained and fixed in an extremely efficient manner, wholly without the use of either loose clamping pads or welds or adhesive joints. This affords considerable freedom in the design of the sealing jaw and the thermal strip and completely obviates those problems which were previously associated with this type of sealing jaw. The design and construction also ensure good contact between the thermal strip and the jaw body, which not only makes for a good fixing of the thermal strip so that this, despite temperature movements and lengthy periods of operation, is accurately held in place, but also ensures a good removal or dissipation of excess heat. The slots of the thermal strip not only provide for an increased and improved cooling possibility but moreover make it possible, by varied slot depth, to ensure that certain portions of the thermal strip are at a higher working temperature than surrounding portions, which may be utilized so as to compensate for, for example, thicker or more insulating portions of the packaging material which are to be sealed, as well as the possibility of adapting the level of heating to the packaging material in question while maintaining the level of current power supply in the machine.

While this invention has been illustrated and described in accordance with a preferred embodiment, it is recognized that variations and changes may be made by others, and equivalents employed, without departing from the invention as set forth in the claims.

What is claimed is:

1. An apparatus for heat-sealing thermoplastic material, comprising a sealing jaw defined by a jaw body, and a thermal strip, the jaw body being of one piece manufacture and including a groove in which a portion of the thermal strip is disposed so that an oppositely located working surface of the thermal strip projects beyond the jaw body, a portion of said jaw body being plastically deformed to mechanically anchor the thermal strip within the groove, said portion of the thermal strip disposed in the groove being provided with a plurality of spaced apart slots, and an electrically insulating layer being located between the jaw body and the groove.

2. The apparatus as claimed in claim 1, wherein the jaw body is comprised of anodized aluminum.

3. The apparatus as claimed in claim 1, including cooling ducts disposed internally of the jaw body.

4. The apparatus as claimed in claim 1, wherein the thermal strip, is provided with an electrically insulating surface layer at portions of the thermal strip which face towards the jaw body.

5. The apparatus as claimed in claim 1, wherein the thermal strip is comprised of a resistor alloy.

6. The apparatus as claimed in claim 5, wherein the thermal strip has a coefficient of thermal expansion of less than $17 \times 10^{-6}$ (20°–500° C.).

7. The apparatus as claimed in claim 1, wherein the thermal strip is I-shaped in cross section.

8. The apparatus as claimed in claim 1, wherein the thermal strip is L-shaped in cross section.

9. The apparatus as claimed in claim 1, wherein the thermal strip is V-shaped in cross section.

10. The apparatus as claimed in claim 1, wherein the working surface of the thermal strip is provided with a linear, raised region.

11. The apparatus as claimed in claim 1, wherein the thermal strip is fixed a slight distance above a bottom of the groove.

12. The apparatus as claimed in claim 1, wherein the sealing jaw includes more than one thermal strip.

13. The apparatus as claimed in claim 1, including two cooperating sealing jaws which each include a thermal strip.

14. The apparatus as claimed in claim 13, wherein the thermal strip on one sealing jaw includes a planar working surface and the thermal strip on the other sealing jaw includes a working surface that is narrower than the planar working surface.

15. An apparatus for heat-sealing thermoplastic material, comprising a jaw body provided along one side with a groove, said jaw body having clamping portions which extend on either side of the groove, a thermal strip having one portion that is positioned in the groove between the clamping portions and an oppositely located working surface portion that projects beyond said one side of the jaw body, at least one of said clamping portions of the jaw body being plastically deformed to mechanically anchor said one portion of the thermal strip within the groove, said one portion of the thermal strip that is positioned in the groove being provided with a plurality of spaced apart slots, at least one electric terminal connected to the thermal strip, and an insulating layer for preventing contact between the electric terminal and the jaw body.

16. The apparatus as claimed in claim 15, wherein said groove in the jaw body has a bottom, said one portion of the thermal strip which is positioned in the groove between the clamping portions being spaced from the bottom of the groove to define a space between the thermal strip and the bottom of the groove.

* * * * *